Nov. 21, 1967  M. CHARNEY  3,353,466

PHOTOGRAPHIC STILL CAMERAS WITH BUILT-IN FLASH

Filed May 24, 1965 2 Sheets-Sheet 1

MICHAEL CHARNEY
INVENTOR.

BY R. Frank Smith
Ronald S/Cowlen
ATTORNEYS

Nov. 21, 1967 M. CHARNEY 3,353,466
PHOTOGRAPHIC STILL CAMERAS WITH BUILT-IN FLASH
Filed May 24, 1965 2 Sheets-Sheet 2
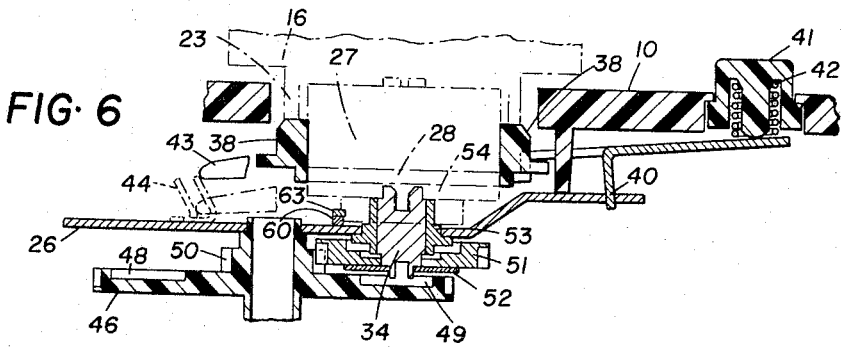
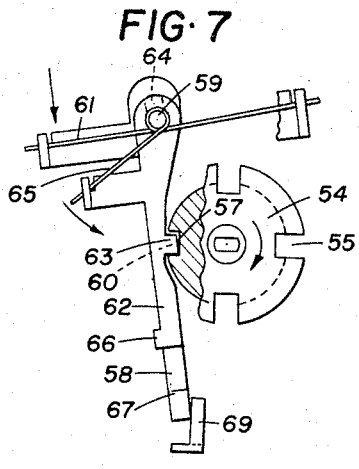
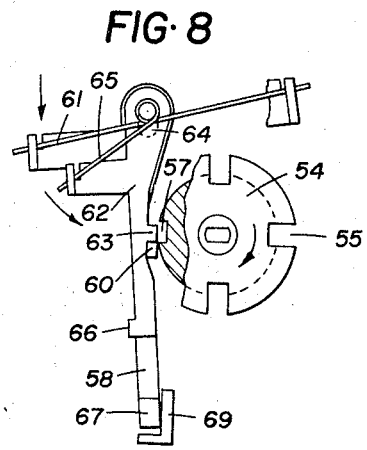
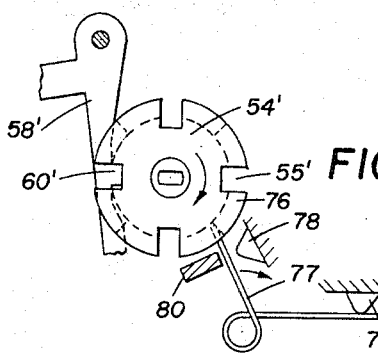
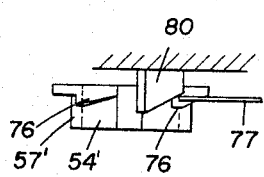
MICHAEL CHARNEY
INVENTOR.
BY R. Frank Smith
Ronald S/Cander
ATTORNEYS

United States Patent Office 3,353,466
Patented Nov. 21, 1967

3,353,466
PHOTOGRAPHIC STILL CAMERAS WITH BUILT-IN FLASH
Michael Charney, Rochester, N.Y., assignor to Eastman Kodak Company, Rochester, N.Y., a corporation of New Jersey
Filed May 24, 1965, Ser. No. 457,980
1 Claim. (Cl. 95—11.5)

ABSTRACT OF THE DISCLOSURE

A multilamp unit socket that is manually rotatable and is rotated automatically with film advance, rotation with film advance benig controlled by a movable metering pawl, the improvement of a latching pawl to ensure proper operation of the automatic rotation notwithstanding manual rotation of the socket.

---

The present invention relates to photographic still cameras, and more particularly, to cameras with built-in flash systems for receiving a unitary package containing a plurality of photoflash lamps and individual reflectors.

There has been developed a unitary, disposable multilamp photoflash package disclosed, for example, in applications for United States letters patent, Franklin D. Kottler et al., Ser. No. 417,914 now Patent No. 3,327,105, and Dean M. Peterson et al., Ser. No. 417,913, now Patent No. 3,327,105, both filed Dec. 14, 1964. The present invention comprises a compact and reliable mechanism for receiving and automatically indexing such a package to successively place unused photoflash lamps in a camera photoflash circuit for augmenting scene light in timed relation with camera operation.

A roll film camera having a mechanism according to the invention suitably includes a rotatable socket for receiving a multilamp package, a means to position the socket with one lamp of the package in the photoflash circuit, a release element actuated by camera operation to permit socket rotation, and a drive and indexing mechanism operatively connecting the socket and the film winding mechanism to rotate the socket and place successive others of the lamps in the photoflash circuit as the film is being wound. According to the preferred embodiment, the socket includes a socket cover having an access opening for insertion of a multilamp package, a ribbed base and spring to rigidly retain the package in the base, and a keyed friction clutch connecting the socket to the drive mechanism to drive the socket or to permit manual rotation of the socket relative to the drive means, as desired. The drive mechanism may itself comprise a compact slip clutch arrangement operatively connected to the film wind gearing.

According to the present invention, there is provided a latching member to ensure proper operation of such a drive mechanism having both automatic indexing and manual rotation of the lamp package socket.

An important object of the present invention resides, therefore, in the provision of a new and improved photographic still camera having a socket receiving multilamp photoflash units or packages, and a compact mechanism to automatically index such units or to permit manual rotation of the socket and received unit without interference with the automatic indexing mechanism.

This and other objects and advantages will become more apparent in the course of the following description, the accompanying drawing forming a part thereof and wherein:

FIG. 6 is a cross-section of the drive mechanism and package ejection arrangement;

FIGS. 7 and 8 show two stages of operation of the release and indexing features; and FIGS. 9 and 10 respectively show top and side views of an alternate arrangement of the indexing mechanism to ensure proper socket positioning.

Figure 1:
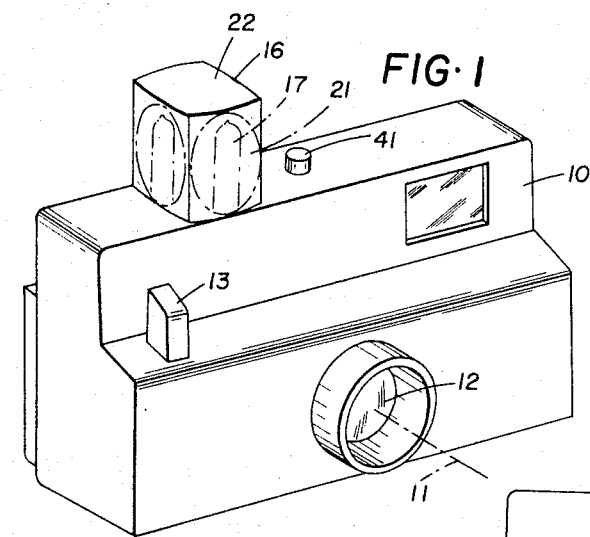
FIG. 1 is a perspective view of a photographic still camera embodying the present invention and including a multilamp package or unit inserted thereon.
Figure 2:
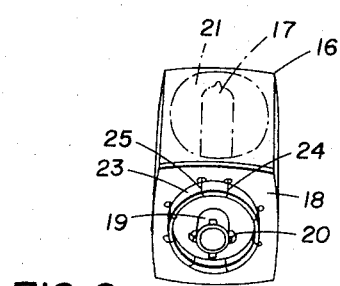
FIG. 2 is a rear perspective view of the camera with the multilamp package removed.

Referring to FIGS. 1 and 2, a camera embodying the present invention comprises a light-tight housing 10 in which roll film is typically exposed by successively positioning frame portions of the film on the film plane of a picture taking axis 11. Exposure is made through a light aperture on the axis 11 by focusing an image of a scene on the film plane by an objective lens 12 for a predetermined time period. Operation of the camera is accomplished by depressing an accessible body release button 13, which operates a shutter and aperture control mechanism in a known manner. Winding of the roll film to successively position the film frames on the film plane is accomplished by means of a winding lever 14 accessible from the back of the camera housing 10.

On the top wall of housing 10 is located a socket assembly 15 for receiving a multilamp photoflash package 16 with a selected one of a plurality of flash lamps 17 facing in the direction of the picture taking axis 11.

The multilamp package or unit 16, as is more fully described in the applications referred to above, comprises a plurality (four) of miniature photoflash lamps 17 of known manufacture (AG. variety) ordinately mounted on a rotatable base 18 about a vertical axis of rotation defined by a depending center post 19. The center post 19 has a hollow cylindrical shape and includes four radially extending lugs 20 having upper and lower ramped surfaces engageable with retaining means in a receiving socket arrangement.

The base 18 defines four lamp sides at which the lamps 17 are located, and disposed behind each lamp 17 is a dish-shaped light reflector 21 of preformed sheet material to provide the desired light emission pattern. A light transmitting protective cover 22 of cubic shaped is fixed to the base and overlies the lamps 17 and reflectors 21 to enclose the package.

An annular contact ring 23, coaxial with the center post 19, extends below the base 18. Pairs of lead-in wires 24, 25 from each photoflash lamp 17 pass through the base 18 and are wrapped vertically around the contact ring 23 for selective electrical connection by engagement with the terminals of a flash synchronizing circuit to fire the flash lamp in timed relation with camera operation in a known manner.

Located within the camera housing 10 are the elements of the multilamp flash package advancement mechanism operable to receive and selectively advance an inserted multilamp package during film wind.

Figure 4:
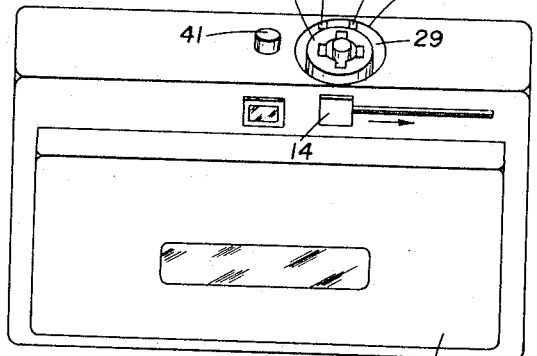
FIG. 4 is a cross section of the novel socket arrangement, as taken on line 4—4 of FIG. 3.
Figure 4:
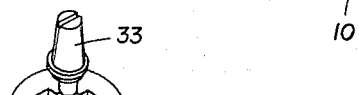
Figure 4:
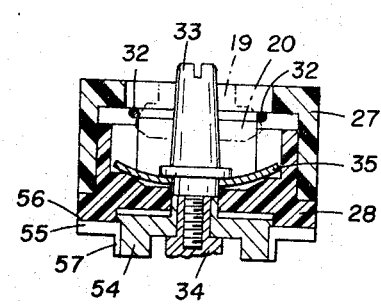
Figure 5:
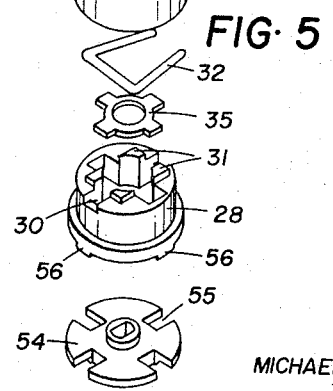
FIG. 5 is an exploded view showing the various elements of the socket arrangement.

Mounted at the top wall of the camera housing 10 is the receiving socket assembly 15, which is formed of an upper portion 27 and a lower portion 28, a part of which is telescoped into the upper portion 27 and fixed thereto (FIG. 4). The upper portion 27 defines an access opening shaped as shown to permit insertion of the connecting post 19 and retaining lugs 20 of a multilamp package 16 in any one of four preselected positions in which one flash lamp 17 faces in the direction of the picture taking axis 11.

The lower socket portion 28 also defines slots 30 aligned with the access opening of the upper portion 27. The top surface of the lower portion 28 further defines a raised rectangular boss 31 about which is positioned a square shaped hair spring 32. The resilient arms of the spring 32 overlie a pair of opposing slots 30 for lateral movement outwardly and engagement with a pair of opposing retaining lugs 20 of an attached package.

Fitting within the slots 30 of the lower socket portion 28 is a four legged plate spring 35 having a center opening through which is mounted a stabilizing stud 33 fixed to a shaft 34 by threading or the like. As may be seen in FIG. 4, the plate spring 35 is held down by a collar on the stud 33, and the spring legs act against the bottom socket portion 28 to urge the bottom portion downwardly. Both the socket portion 28 and spring 35 are, however, free to rotate relative to stud 33.

The socket assembly 15 is spaced from the top wall of the housing 10 to define an annular recess 29 which receives the contact ring 23 of an inserted flash unit 16. A pair of contact terminals 36, 37 of a suitable flash synchronizing circuit are disposed at the front of the recess 29 to engage the lead-in wires 24, 25 of the forward facing lamp 17, thereby placing the forward lamp 17 in the flash circuit.

To attach a multilamp package 16, the center post 19 of the package is inserted into the socket access opening with the stabilizing stud 33 fitting into the center post 19. During insertion, the lower ramped surfaces of an opposing pair of retaining lugs 20 urge the arms of the retaining spring 32 outwardly until the package 16 is fully seated. At this time the spring arms spring inwardly over the upper ramped surfaces of the opposing lugs 20 to firmly retain the package 16 in the socket assembly 15.

Encircling the upper socket portion 27 is an annular ejector ring 38 which is vertically slideable relative to the socket to engage the lower edge of the contact ring 23 and thereby eject the package from the socket. The ejector ring 38 is controlled from below by a bifurcated ejector yoke 39 which fits on both sides of the ring 38 at the bifurcated end under a suitable collar formed in the ejector ring 38. The yoke is pivotably mounted by an integral pin 40 (FIG. 6) to a fixed mechanism plate 26 within the housing 10. The other end of yoke 39 is engaged by the lower end of an ejector button 41 which is accessible from the top wall of the camera housing 10 as shown in FIGS. 1 and 2. A compression spring 42 mounted between the button 41 and yoke 39 urges the button 41 upwardly against the top camera wall and further urges the bifurcated end of yoke 39 upwardly against the ejector ring 38 to eliminate play.

One leg 43 of the bifurcated end of ejection yoke 39 has an extension to engage a movable member 44 forming part of a known camera operating control mechanism, such as a shutter speed change or a diaphragm adjustment mechanism. For example, the member 44 may be biased by a control spring to a daylight operation position (to the right as seen in FIG. 6) in which the camera mechanism is set for daylight or automatic exposure control. Insertion of a flash package 16 moves the ejection ring 38 and yoke 39 downwardly to thereby move the member 44 against the spring bias to a flash exposure control position (to the left in FIG. 6). An operating control mechanism of this type to control shutter speed is disclosed, for example in U.S. Patent No. 3,175,479, issued Mar. 30, 1965.

Figure 3:
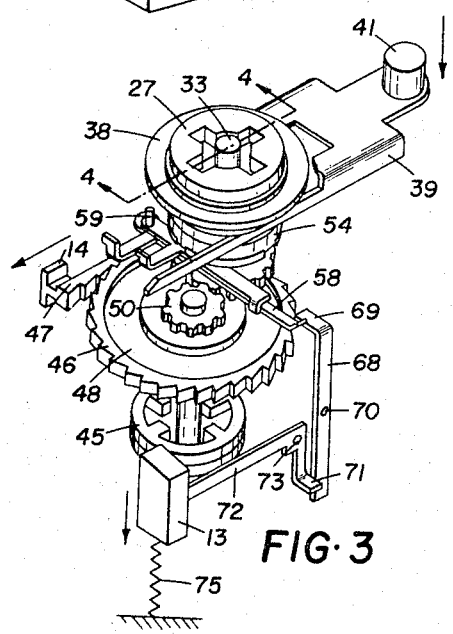
FIG. 3 is a simplified perspective view showing a preferred embodiment of the present invention.

According to the embodiment shown, rotation of an attached package 16 to succesively place the lamps 17 in the flash circuit is accomplished by coordination with film wind. Thus, there is shown a portion of a typical film take-up spool 45 on which roll film is wound frame by frame after each exposure. The take-up spool 45 is operatively connected to a film wind gear 46 which is selectively rotated in the direction of the arrow by a winding rack 47. The winding lever arm 14, accessible from outside the camera body may be formed integrally with the rack to move the rack to the left as shown in FIG. 3 (to the right in FIG. 2) against the bias of a rack return spring and thereby wind film onto spool 45. Metering notches in the film or suitable frame numbers visible through a window in the back of the camera housing 10 may be used to indicated when the next successive unexposed frame of film is positioned on the film plane.

The film wind gear 46 is formed to define an annular recessed bearing surface 48 in its top surface, the center line of which intersects the axis of rotation of the socket assembly 15 and inserted flash package 16. A pivot idler pin 49 of circular shape fits within the surface 48 to define a lower rotational bearing surface for the shaft 34. Integral and coaxial with film wind gear 46 is a socket indexing drive gear 50 which meshes with a driven gear 51. The lower face surface of gear 51 forms a friction clutch surface with the upper face of a friction clutch plate 52 fixed to the shaft 34.

Thus, rotation of the film gear 46 through rack 47 causes simultaneous rotation of drive gear 50 and driven gear 51. The rotation of the drive gear is then transmitted to shaft 34 by the friction clutch plate 52 until the frictional engagement of the clutch is overcome. A bearing 53, mounted on the fixed mechanism plate 26, permits stable rotation of the shaft 34.

In order to selectively rotate the socket assembly 15 and inserted package 16 to place the lamps 17 in the flash circuit, there is provided a latching and release mechanism designed to control the rotational motion from film wind. In this respect, a socket cam 54 is located below the lower portion 28 of the socket assembly 15. Cam 54 is keyed to shaft 34 for rotation therewith and includes four equi-spaced radial detent grooves 55 in its upper surface. Correspondingly, the lower surface of the lower portion 28 includes mating curved lobes 56 engageable with the grooves 55. The engaging grooves and lobes couple the cam 54 and socket assembly 15 to transfer the rotational motion of the slip clutch mechanism through the shaft 34 and keyed cam 54 to the socket assembly 15. Sufficient torque applied directly to the socket 15, however, as by grasping and turning an inserted package 16 by hand, results in lobes 56 raising the socket 15 against the bias of plate spring 35, thereby permitting manual rotation of the socket assembly without disturbing the winding and indexing mechanism.

The cam 54 further includes a reduced step portion defining four radial indexing slots 57 equi-spaced on the periphery of the step portion as extensions of grooves 55. A metering pawl 58 pivotable about a fixed pivot 59 on the mechanism plate 26 includes a metering lug 60 selectively engageable with the slots 57. The metering pawl 58 defines an elongated slot 64 cooperating with pivot 59, and a tension spring 61 biases the pawl lug 60 into selective engagement with the slots 57 and along the periphery of the cam in a direction opposite to the cam rotation (down in FIGS. 7 and 8).

According to the present invention, a separate latch lever 62 also is provided, the latch lever 62 pivoted for rotational motion only about pivot 59 and including a lug 63 engageable with the slots 57. A latch spring 65 urges latch lever 62 toward the cam for selective engagement of lug 63 with the slots 57. A control lug 66 at the movable end of latch 62 is engaged by metering pawl 58 to move the latch lever 62 against the spring bias whenever the metering pawl is moved against its spring bias (clockwise in FIGS. 7 and 8). Movement of the metering pawl 58 is controlled through a lug 67 on the pawl 58 engaged by end 69 of a metering lever 68. Lever 68 is pivoted about a pivot 70, and its movement in turn is controlled through a lug 71 an indexing release lever 72. Lever 72 is pivoted about 73 (counterclockwise in FIG. 3) to downward movement of the body release button 13. A tension spring 75 normally urges button 13 upward, which in turn urges the linked levers toward the positions shown in FIG. 3.

For camera operation with augmenting flash, a flash package 16 is inserted into the receiving socket assembly 15 with an unused flash lamp 17 facing in the direction of the picture taking axis 11. As the package is inserted, the contact ring 23 urges ejection ring 38 and yoke 39 downwardly to set the exposure control mechanism for flash operation by movement of member 44 in response to the extended arm 43 of the ejection yoke 39. At this time both lugs 60, 63 are in engagement with the adjacent slot 57 to maintain the socket in position (FIG. 7).

Assuming the camera to be otherwise ready for operation, the camera is then aimed at the desired subject and the body release button 13 is depressed to operate the shutter mechanism to expose the frame of photosensitive film on the film plane according to predetermined flash exposure values. In timed relation therewith the forward facing flash lamp 17, which is placed in the flash circuit by engagement with terminals 36, 37, is fired by the closing of a known shutter synchronizer switch.

Immediately before operation of the shutter mechanism, the release lever 72 acts in response to body release button 13 to move the metering lever 68 counterclockwise and thereby disengage the latch lug 63 and metering pawl lug 60 from the adjacent indexing slot. As this occurs, the pawl spring causes the metering pawl 58 to be displaced forwardly through its pivot slot 64 and prevents re-engagement of the pawl lug 60 into the adjacent slot 57. In like manner, latch lug 63 is prevented from re-engaging the slot 57 because of the control lug 66 (FIG. 8).

After the film exposure with augmenting flash, the film is then wound onto the film take-up spool 45 by the winding lever 14 until the next film frame is positioned on the picture taking axis 11. As the film wind drive gear 46 is rotating in the direction of the arrow to wind film, the integral clutch drive gear 50 rotates the socket assembly 15 through the operative drive connection described until the cam 54 (and socket assembly 15) has turned clockwise (FIG. 8) through a one quarter turn to place the next lamp 17 in the circuit. As the socket assembly 15 approaches the limit of rotation, the subsequent indexing notch 57 corresponding to the position of the next lamp 17 moves into alignment with the forwardly displaced metering pawl lug 60. The metering pawl lug 60 then engages the notch 57 by the urging of pawl spring 61, and the cam causes the pawl 58 to be moved back into the position shown in FIG. 7 as the socket assembly 15 completes the quarter turn. The latch lug 63 then engages the notch 57 by virtue of its spring bias, and the cam 54 and socket assembly 15 are latched in the position shown in FIG. 7 to prevent further rotation of the socket assembly. Further operation of the film winding mechanism to completely wind the subsequent frame of film onto the film plane causes the friction clutch (gear 51-plate 52) to slip, thereby permitting additional indeterminate rotation of the film spool 45 without further rotation of the socket assembly 15.

In the event that a lamp 17 other than the forward firing lamp is desired to be placed in the circuit, the package and socket assembly 15 may be grasped and rotated by hand to permit relative rotation of the socket assembly 15 and cam 54 as described and place any selected one of the flash lamps in the circuit without disturbing the film and socket drive mechanism. The latch lug 63 prevents rotation of the cam 64 in either direction until after camera operation to make an exposure as described. Thus, in the absence of the latch lug 63 according to the present invention, it might be possible to rotate cam 54 a slight amount counterclockwise as shown in FIG. 7 by manual rotation through lobes 56 of the socket assembly. Such rotation would move pawl 58 toward its FIG. 8 position in which alignment with engaged slot 57 would permit reengagement of lug 60 after camera operation.

After four complete flash pictures have been taken, or whenever daylight operation of the camera is desired, the package 16 may be removed by depressing the accessible ejection button 41 to pivot the yoke 39 and move ejector ring 38 upwardly against the package contact ring 23. The upper ramped surfaces of the engaged lugs 20 move the retaining spring arms outwardly to enable ejection of the package.

FIGS. 9 and 10 show an alternate construction of the socket cam arrangement to ensure exact alignment of the socket assembly 15 with the picture taking axis 11, thereby providing exact placement of the forward facing lamp 17 and reflector 21 in the photoflash circuit.

The alternate construction shown in FIGS. 9 and 10 comprises a socket cam 54' having four wedge-shaped teeth 76 positioned adjacent the indexing slots 57' (and grooves 55') as shown. A spring end 77 is engageable with the teeth 76 with a bias in the direction of the arrow to urge the cam 54' counterclockwise (FIG. 9) in an indexed position to prevent play between lug 60' of pivot 58' and the engaged indexing slot 57'. Stops 78 and 79 are provided to prevent excessive spring motion. Whenever the cam 54' is rotated clockwise during film wind, the engaged tooth 76 moves the spring end 77 against its bias for engagement with a fixed control cam 80 to cause the spring end 77 to release the engaged tooth 76 and return to a position enabling it to engage the next tooth 76. Of course, whenever pawl 58' is provided with an elongate pivot slot as in the preferred embodiment, a corresponding latch lever (as 62 in FIG. 7) would prevent counterclockwise rotation during engagement of a slot 57'.

While this invention has been described with reference to a preferred embodiment, it is obvious that changes can be made and variations resorted to without departing from the spirit of the invention or the scope of the subjoined claim.

I claim:

In a roll film camera having means to wind film to successively place frames of film on a picture taking axis, a rotatable socket portion to receive and retain a unitary package containing a plurality of photoflash lamps and individual reflectors in a fixed position relative thereto; means operatively connecting the film wind means and socket means to operatively rotate the socket portion and received package through selected positions to successively place the photoflash lamps at a photoflash synchronizing circuit location with corresponding film frames for flashing the lamps in timed relation with camera operation, the operatively connecting means including a rotatable socket cam engaging the socket portion, drive means to rotate the cam and socket portion with film wind, a laterally movable metering pawl engageable with slot means defined by the cam to terminate cam rotation when the socket is moved to a successive position, and means responsive to camera operation to withdraw the metering pawl from engagement with the slot means and to move the metering pawl out of alignment therewith by lateral movements of the pawl to permit further cam and socket rotation, the improvement comprising a pivotable latch lever to prevent reengagement of the metering pawl after camera operation resulting from a manual rotation of the socket portion before camera operation, the latch lever having means engaging the slot means defined by the cam and preventing both cam rotation and lateral movement of the pawl during cam engagement and means responsive to pawl movement to disengage the latch lever but remain in alignment with the slot means in response to camera operation.

References Cited
UNITED STATES PATENTS

| | | |
|---|---|---|
| 3,087,318 | 4/1963 | Oswold. |
| 3,096,025 | 7/1963 | Prochnow _____ 240—1.3 |
| 3,107,862 | 10/1963 | Moore et al. _____ 240—1.3 |
| 3,244,087 | 4/1966 | Anderson et al. _____ 95—11 |

NORTON ANSHER, *Primary Examiner.*

F. L. BRAUN, *Assistant Examiner.*